United States Patent [19]

Kvamme

[11] Patent Number: 4,586,866
[45] Date of Patent: May 6, 1986

[54] AUTOMOBILE TOWING APPARATUS
[75] Inventor: Rolf Kvamme, Aurora, Canada
[73] Assignee: Mobi-Jack Inc., Aurora, Canada
[21] Appl. No.: 624,840
[22] Filed: Jun. 26, 1984
[30] Foreign Application Priority Data
Jul. 15, 1983 [CA] Canada .................................. 432526
[51] Int. Cl.[4] ............................................... B60P 3/12
[52] U.S. Cl. ..................................... 414/563; 280/402
[58] Field of Search ................ 414/563, 742; 280/402;
212/233, 255

[56] References Cited
U.S. PATENT DOCUMENTS

| | | | |
|---|---|---|---|
| 2,436,000 | 2/1948 | Fleming | 414/563 |
| 3,127,037 | 3/1964 | Newman | 414/563 |
| 3,434,607 | 3/1969 | Nelson | 414/563 |
| 3,599,811 | 8/1971 | Watkins | 414/563 |
| 3,924,763 | 12/1975 | Pigeon | 414/563 |
| 3,951,280 | 4/1976 | Peck | 414/563 |
| 4,239,250 | 12/1980 | Tolle | 414/563 X |
| 4,384,817 | 5/1983 | Peterson | 414/563 |
| 4,451,193 | 5/1984 | Cannon, Jr. et al. | 414/563 |
| 4,473,237 | 9/1984 | Lind | 414/563 X |
| 4,473,334 | 9/1984 | Brown | 414/563 |
| 4,534,579 | 8/1985 | Shackelford, Sr. | 414/563 X |

FOREIGN PATENT DOCUMENTS 438044 11/1967 Switzerland .

Primary Examiner—Robert J. Spar
Assistant Examiner—Stuart J. Millman

[57] ABSTRACT

Automobile towing apparatus for mounting on a tow truck has a pivotal boom that projects rearwardly from the truck. The boom has a forward portion extending along the truck, the rear end of this forward portion being connected to a downwardly extending portion located just beyond the rear of the truck. The lower end of the downwardly projecting portion supports a rear portion that is extensible and in turn supports a transverse beam, on the ends of which there is mounted a pair of vehicle lifts for engaging and lifting the wheels of a disabled vehicle. This beam has limited rotation about a front to rear horizontal axis to accommodate loading a vehicle standing on a sideways slope. The boom is pivotable, optionally, about a pair of transverse horizontal axes located at the respective ends of the forward boom portion. This arrangement enables the vehicle lifts to be moved among (a) a normal, horizontal loading position close to the ground, (b) an elevated towing position and (c) a down-sloped position for loading a disabled vehicle standing on ground sloping away from the rear of the tow truck. The vehicle lifts are freely upwardly pivotable to facilitate loading a vehicle standing on ground sloping upwards from the rear of the truck. The beam is also mounted for rotation about a vertical axis to accommodate towing around a corner, this movement being inhibited when loading. Brake bars can be lowered when towing to provide added safety in the event of the truck losing control. The resultant apparatus is more versatile than previous arrangements in relation to loading a disabled vehicle standing on a slope, and is also safer and more foolproof to operate.

13 Claims, 12 Drawing Figures

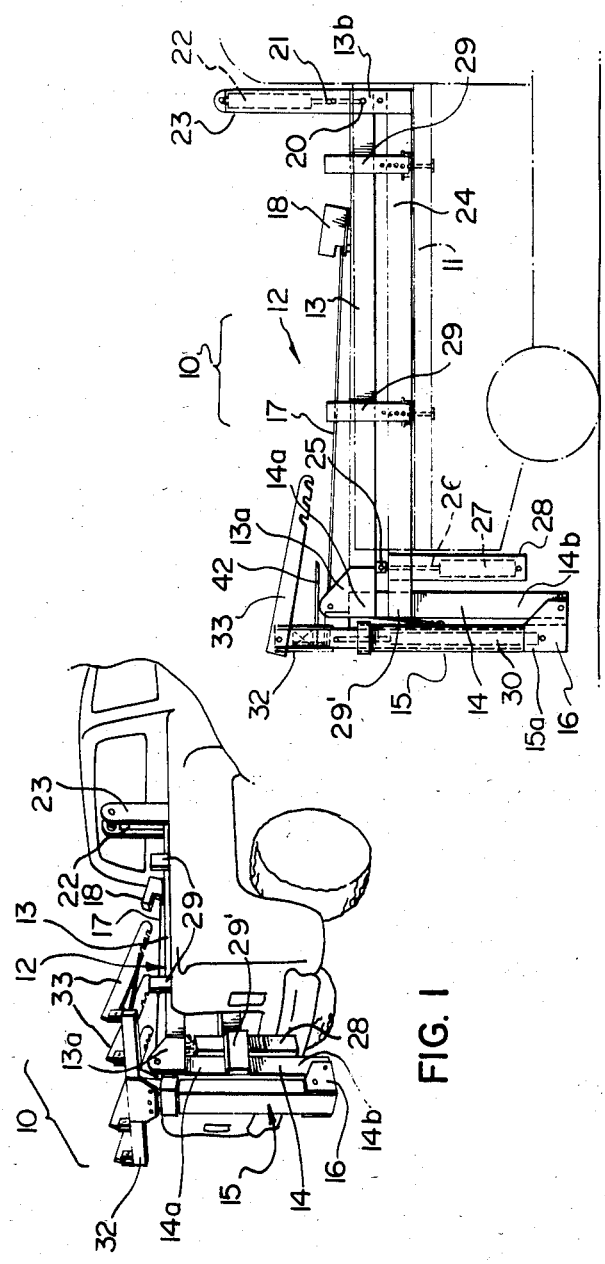

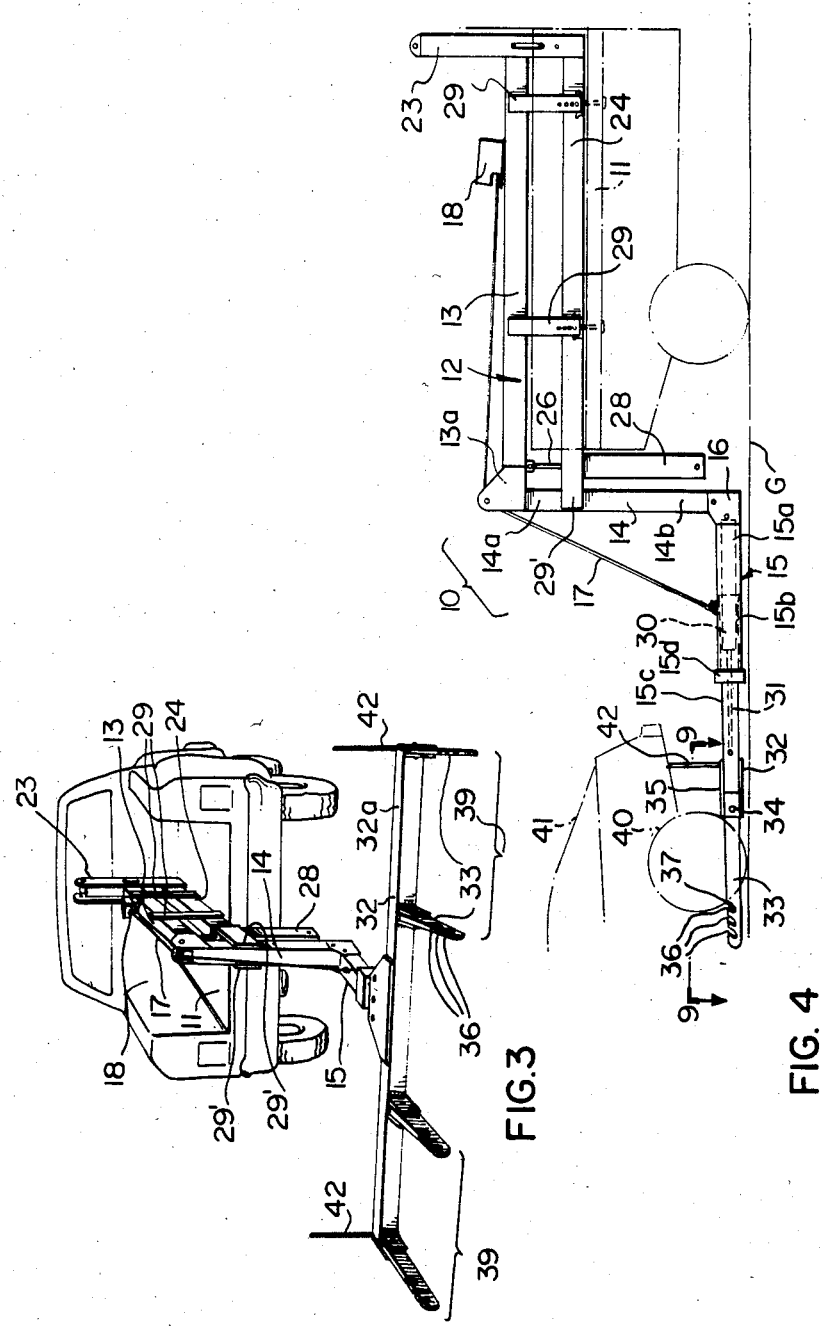

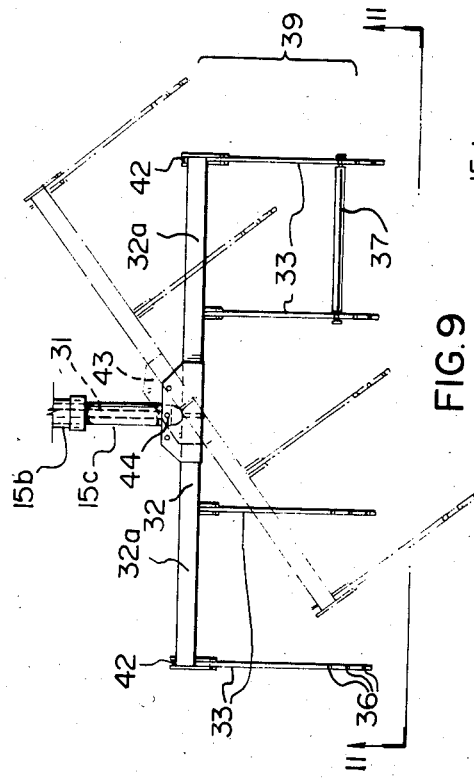
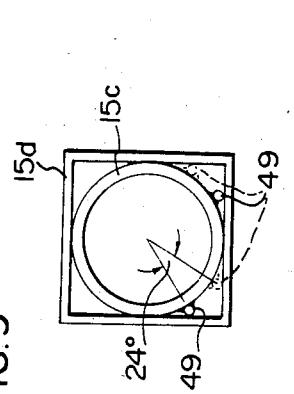
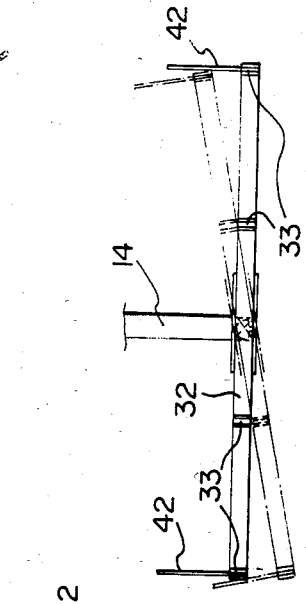

AUTOMOBILE TOWING APPARATUS

BACKGROUND OF THE INVENTION

This invention relates to automobile towing apparatus, and more particularly to apparatus of the type that can be mounted on the rear of a tow truck to provide an extensible and pivotal boom that carries a pair of spaced apart vehicle lifts for engaging portions, preferably the wheels, of a vehicle to be towed (referred to below for convenience as the "disabled vehicle" or simply "the vehicle").

Devices of this general type have been known for many years. Such developments are shown, for example, in U.S. Pat. Nos. 3,434,607 issued Mar. 25, 1969 to A. W. Nelson, 3,599,811 issued Aug. 17, 1971 to W. F. Watkins, 3,924,763 issued Dec. 9, 1975 to N. G. Pigeon (Canadian Pat. No. 986,155 issued Mar. 23, 1976) and 4,384,817 issued May 24, 1983 to F. H. Peterson.

Various practical difficulties have been experienced with these devices, however, especially when loading a disabled vehicle that is standing on sloping ground. Three sloping situations can typically arise and need to be accommodated, i.e. the disabled vehicle can have either a transverse, a forward or a rearward slope relative to the tow truck. Such situations often occur when the tow truck is required to load a disabled vehicle that is standing in a driveway that slopes either upwardly or downwardly from a street, or when the disabled vehicle is off a road on rough ground. Combinations of these slopes can also arise, as when the vehicle is in a ditch.

SUMMARY OF THE INVENTION

The primary objective of the present invention is to provide improvements in towing apparatus of the kind described, such improvements being designed to accommodate these sloping situations in a safe and efficient manner.

The invention is also concerned with safety generally, both at the time of loading the disabled vehicle and subsequently, i.e. during travel of the tow truck and the disabled vehicle in a towing operation.

To these ends, the invention provides a number of novel features that may be adopted alone or in combination.

Among these features are:

1. The provision of one or more sloped loading positions in which the vehicle lifts slope rearwardly from the ground on which the truck stands. Provision for both upward and downward sloping in the rearward direction is desired.

2. The vehicle lifts are mounted on a beam adapted to pivot about a front to rear horizontal axis to provide a side-sloped loading position.

3. The beam carrying the vehicle lifts is pivotable about a vertical axis, with such pivotal movement being inhibited until a predetermined force is exerted to overcome such inhibition. This enables the beam to be effectively non-pivotable about the vertical axis during a loading operation (when firmness is required) but pivotable about such axis when towing, such pivoting being essential to enable the tow truck to round a corner. Past devices have provided for the two conditions by means of a removable pin that locks the beam in place, but accidents have arisen due to the operator's forgetting to remove the pin before commencing to tow.

4. The vehicle lifts are provided with at least one brake bar, preferably two, movable between a braking position in which it projects below the vehicle lifts towards but not engaging the ground, for use during a towing operation, and an inoperative position in which it does not project below the vehicle lifts, for use when loading. If an emergency arises during towing, e.g. the truck goes out of control, the operator can lower the vehicle lifts so that the brake bar or bars engage the ground to act as an emergency brake.

An example of towing apparatus embodying these various novel features is illustrated, by way of example, in the accompanying drawings, but, in its broad scope, the present invention is limited only by the subsequent claims.

BRIEF DESCRIPTION OF THE DRAWINGS

FIG. 1 is a perspective side view of apparatus embodying the invention in the stored condition on a tow truck;

FIG. 2 is a diagrammatic side view of the apparatus of FIG. 1 with the side of the truck cut away;

FIG. 3 is a rear perspective view of the apparatus of FIG. 1 in its operational condition;

FIG. 4 is a side view of FIG. 3, again diagrammatic and demonstrating how a disabled vehicle on level ground is loaded;

FIG. 8 is a view of a rod used in the apparatus;

FIG. 9 is a plan view of the vehicle engaging portion of the apparatus, taken on the line 9—9 in FIG. 4;

FIG. 10 is a detail of a central part of FIG. 9 showing the mechanism employed for pivoting about a vertical axis;

FIG. 11 is an end view taken on the line 11—11 in FIG. 9; and

FIG. 12 is a detail of a central part of FIG. 11 showing the mechanism employed for pivoting about a horizontal axis.

DETAILED DESCRIPTION OF THE PREFERRED EMBODIMENT

Figure 5:
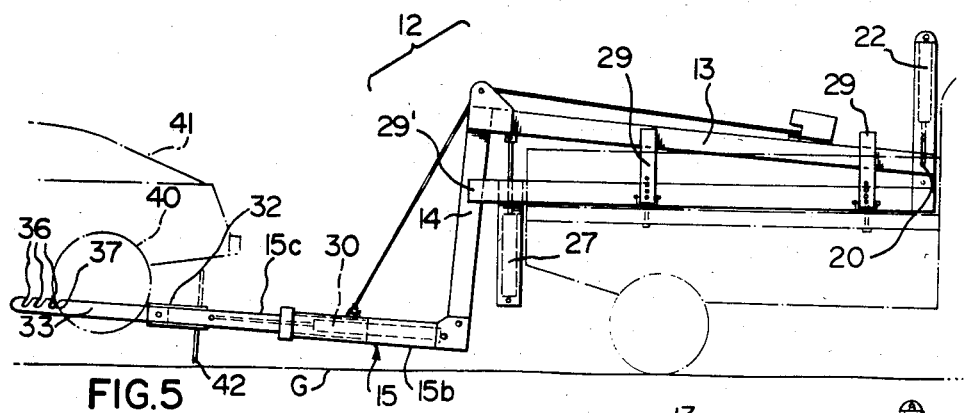
FIG. 5 is a side view of the apparatus when towing.
Figure 6:
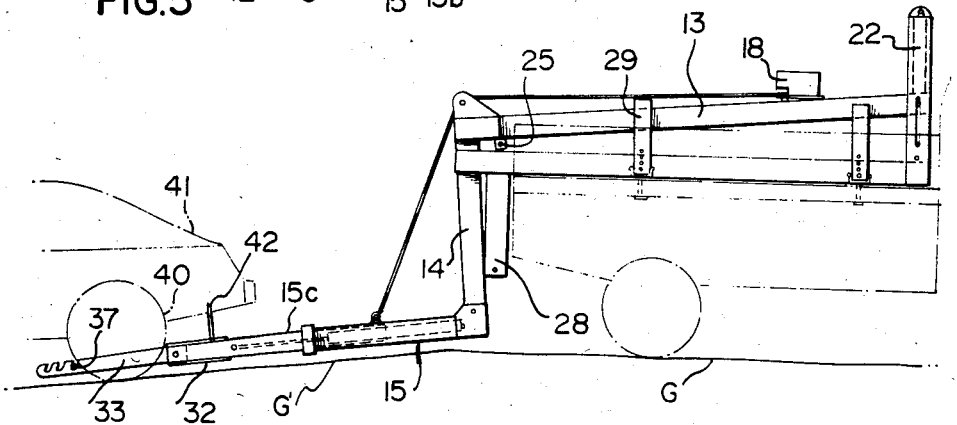
FIG. 6 is a side view showing loading a disabled vehicle on a down slope.
Figure 7:
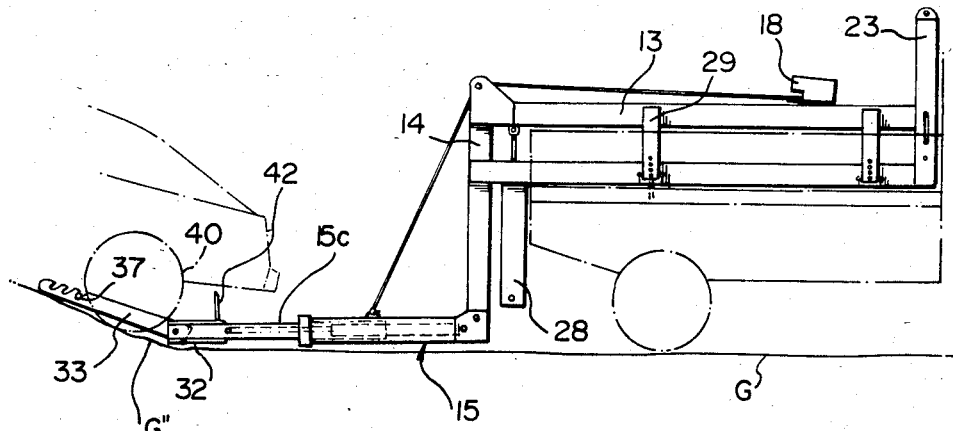
FIG. 7 is a side view showing loading a disabled vehicle on an up slope.

As seen in FIGS. 1 to 4, towing apparatus 10 mounted on a tow truck bed 11 consists of a boom 12 composed essentially of three portions: an upper, generally horizontal, forward portion 13 that extends in a front to rear direction along the centre of the truck bed; an intermediate, downwardly extending generally vertical portion 14 and a rear portion 15. The rear end 13a of the upper portion 13 is rigidly connected to the upper end 14a of the intermediate portion. At its lower end 14b, the intermediate portion 14 pivotally supports a bracket 16 secured to the forward end 15a of the rear portion 15 so that this rear portion of the boom can be moved by a cable 17 and winch 18 between the stowed condition of FIGS. 1 and 2 and the operational condition of FIGS. 3 and 4.

At its forward end 13b, the upper boom portion 13 is pivotally connected by a pin 20 to a piston 21 of a power cylinder 22 mounted on a stanchion 23 extending upwardly from and secured to a main frame member 24 bolted to the truck bed 11. The pin 20 slides in slots in the stanchion 23. Near its rear end 13a, the upper boom portion 13 is pivotally connected by a pin 25 to a piston 26 of a power cylinder 27 mounted in a frame 28 extending downwardly from and secured to the main frame member 24 just beyond the rear of the truck. On each of its sides, the upper boom portion 13 is slidingly embraced by plates 29 and the intermediate portion 14 is similarly embraced by plates 29'. The plates 29, 29' are secured to the frame member 24 in order to restrain movement of the boom in the transverse direction, i.e. to restrict the boom to pivotal movement in a vertical plane extending from front to rear along the truck.

The rear portion 15 of the boom consists of a forward member 15b in which a rearward member 15c is telescopically slidable, such movement being controlled by a power cylinder 30 mounted in the forward member 15b and having a piston 31 connnected to the rearward member 15c.

As seen in FIG. 9, at its remote end the rearward member 15c is pivotally connected about a vertical pin 44 to a transverse beam 32 on which four horizontal arms 33 are pivotally mounted to rotate about a horizontal axis defined by pins 34. Pivotal movement of the arms 33 below the position shown in FIGS. 3 and 4 is prevented by beam surfaces 35, but these arms are free to pivot upward from this position, e.g. in the stowed condition of FIGS. 1 and 2. The remote ends of the arms 33 are provided with notches 36. A bar 37 (FIG. 8) with end grooves 38 is adapted to extend between selected notches of each pair of arms 33 (FIGS. 4–7) to form with a portion 32a of the beam 32 and with the pair of arms an assembly that functions as a vehicle lift 39 that can engage the circumferential face of a tire of a wheel 40 of a disabled vehicle 41 to be towed. It will thus be seen that each vehicle lift consists of a pair of spaced apart, rearwardly extending arms 33, a transversely extending bar 37 and a portion 32a of the beam 32, the latter constituting second transversely extending bar means parallel to and spaced from the bar 37. These parts define a plane A that in the normal loading position shown in FIG. 4 lies substantially adjacent and parallel to the ground G.

At its extreme ends, the beam 32 also carries a pair of brake bars 42 that are manually pivotable from an upwardly extending position (FIG. 4) used when loading a disabled vehicle to a downwardly projecting position (FIG. 5 in solid lines) used when towing.

The pivotal connection between the beam 32 and the rearward boom member 15c is achieved by means of a bracket 43 secured to the beam. This bracket pivotally engages the vertical pin 44 mounted in the member 15c. The latter also carries a circular track 45 (FIG. 10) having a recess 46. In the central position shown in FIG. 10, the recess 46 is engaged by a pin 47 slidable in a hole in the beam 32 and urged by a spring 48 to engage this recess. This arrangement tends to retain the normal transverse alignment of the beam 32 relative to the rearward boom member 15c, but can yield under sufficient force, e.g. towing in a curved path, to enable the beam to swing in the manner shown in broken lines in FIG. 9.

FIGS. 11 and 12 demonstrate a further limited freedom of motion of the beam 32, namely pivoting about a front-to-rear horizontal axis. To achieve this motion the rearward member 15c, which is of circular cross-section, is pivotable in the forward member 15b which is, or at least contains a part 15d, of square cross-section. The member 15c secured to it a pair of bars 49 that can move between the positions shown in solid and broken lines in FIG. 12, further movement being prevented by the walls of the part 15d. A total pivotal angle of about 24° would normally be a convenient dimension to choose, i.e. a tilting or side-sloping of up to about 12° on either side of the horizontal, as demonstrated in FIG. 11, but this angle can vary as required.

In use, once the apparatus 10 has been brought to its operating condition and moved close to the disabled vehicle 41, the tow truck is backed up so that the vehicle lifts embrace the wheels 40 of the vehicle 41 and the bars 37 are then put in place, as shown in FIG. 4. The cylinder 27 is then energized to pivot the boom 12 about the pin 20 and raise the vehicle wheels off the ground (FIG. 5). The cylinder 30 is then contracted and the brake bars 42 placed in the lower position. Towing can then commence. If an emergency arises and the operator wishes to stop the disabled vehicle rapidly, he can utilize the braking effect of the brake bars 42 engaging the ground by allowing the cylinder 27 to lower the rear end of the upper boom portion 13. When rounding a corner the pin 47 will be forced out of the recess 46, permitting the beam 32 to swing in the manner shown in FIG. 9.

The foregoing assumes loading of the disabled vehicle on level ground. If the vehicle 41 is situated on down-sloped ground G' (FIG. 6), the cylinder 22 is contracted during loading to permit the entire boom 12 to pivot about the pin 25. Alternatively, if the vehicle is on up-sloped ground G" (FIG. 7), the cylinders 22 and 27 are kept in their normal positions so that the boom portion 13 remains horizontal, while the arms 33 pivot freely to accommodate the slope. If the contour of the ground requires, this up-sloped loading can be aided by upward tilting of the boom by the cylinder 27. If the ground on which the disabled vehicle stands is side-sloped, the necessary accommodation can be provided by the tilting shown in FIGS. 11 and 12.

While the vehicle lifts 39 have been shown adapted to engage the wheels of the disabled vehicle and this is the preferred arrangement to avoid damage to the vehicle, the invention in its broadest scope is not limited to this feature, the other novel aspects of the apparatus being usable with a pair of vehicle lifts that are shaped, positioned and otherwise adapted to engage other spaced apart parts of the disabled vehicle, such as portions of an axle.

I claim:

1. Automobile towing apparatus for mounting on a tow truck, said apparatus comprising
   (a) a pair of vehicle lifts adapted to engage and lift transversely spaced apart portions of a disabled vehicle, each lift defining a plane,
   (b) a boom having an upper horizontal portion for extending rearwardly along the tow truck from a first transverse pivot axis at a forward location to a second transverse pivot axis at a more rearward location, said boom further having a lower horizontal portion for projecting rearwardly from the tow truck,
   (c) means supporting the vehicle lifts in a horizontal loading position on said lower portion of the boom at transversely spaced apart locations adjacent the ground with their planes generally parallel with the ground,
   (d) means for vertically moving each of said first and second axes independently of each other relative to the tow truck whereby upward movement of the second axis causes pivoting of the boom about the first axis to bring the lower portion of the boom to an elevated position in which the vehicle lifts are elevated above the ground and the disabled vehicle is raised to a towing position and upward movement of the first axis causes pivoting of the boom about the second axis to bring the lower portion of the boom to a down-sloped loading position in which the vehicle lifts lie closely adjacent ground that slopes rearwardly and downwardly away from the ground on which the tow truck stands with the planes of said vehicle lifts extending generally parallel to such sloping ground.

2. Apparatus according to claim 1, wherein each vehicle lift comprises (k) a pair of spaced apart, rearwardly extending arms and a pair of spaced apart, transversely extending bar means joining the ends of the arms, said bar means being adapted to engage portions of a tire of the vehicle and together with the arms defining said plane of the lift, a forward one of said bar means constituting part of said means supporting the lifts on the rear portion of the boom, (i) means mounting the forward end of each arm on said forward bar means to pivot about a transverse axis, and (j) means limiting downward pivoting movement of the rear ends of the arms below a position in which the plane of the lift is horizontal in said horizontal loading position, while permitting said rear ends of the arms to move upwards to bring the plane of the lift into an up-sloped loading position with said plane parallel to ground that slopes upwardly and rearwardly away from the tow truck.

3. Apparatus according to claim 1 or 2, wherein the means supporting the vehicle lifts on the rear portion of the boom include a transversely extending beam at respective ends of which said vehicle lifts are located, means pivotally mounting said beam on said rear portion of the boom for movement about an axis extending rearwardly along said rear portion of the boom to enable said vehicle lifts to lie closely adjacent ground sloping transversely relative to the ground on which the truck is standing in a side-sloped loading position, and means for restricting such pivotal movement of the beam.

4. Apparatus according to claim 1 or 2, wherein the means supporting the vehicle lifts on the rear portion of the boom include a transversely extending beam at respective ends of which said vehicle lifts are located, means pivotally mounting said beam on said rear portion of the boom for movement about a substantially vertical axis in the horizontal loading position, and means for inhibiting such pivotal movement until a predetermined force is exerted to overcome such inhibiting means whereby to render the beam effectively non-pivotable about said vertical axis during a loading operation but pivotable about said vertical axis during towing in a curved path.

5. Automobile towing apparatus for mounting on a tow truck, said apparatus comprising a boom having (i) an upper, generally horizontal, forward portion, (ii) an intermediate, downwardly extending, generally vertical portion, and (iii) a lower, generally horizontal, rear portion, a rear end of the upper portion being connected to an upper end of the intermediate portion and a lower end of the intermediate portion being connected to a forward end of the rear portion, (b) means for mounting front and rear ends of the upper portion at first and second locations on the tow truck so that the intermediate portion extends downwardly adjacent the rear of the truck and the lower portion projects horizontally rearwardly from the truck adjacent the ground, (c) said mounting means comprising a first transverse pivot pin at the first location, a second transverse pivot pin at the second location and respective power means for individually moving each said pin vertically relative to the tow truck whereby upward movement of the second pin causes pivoting of the boom about the first pin to raise the rear boom portion and upward movement of the first pin causes pivoting of the boom about the second pin to lower the rear boom portion, (d) said rear boom portion comprising a forward member and a rearward member, the forward member being connected to the lower end of the intermediate portion and the rearward member being telescopically extensible relative to the forward member, (e) a transversely extending beam centrally pivotally connected to said rearward member for movement about a substantially vertical axis, including means for inhibiting such pivotal movement, and (f) a pair of vehicle lifts mounted on respective ends of said beam for engaging and lifting a pair of wheels of a disabled vehicle, (g) each lift comprising a pair of spaced apart arms extending rearwardly from the beam and having notches for retaining a transverse bar for joining the bars and cooperating with the beam to engage portions of a tire of a said wheel.

6. Apparatus according to claim 5, wherein said means for inhibiting pivotal movement of the beam includes means adapted to yield to a predetermined force to enable the beam to pivot about said substantially vertical axis.

7. Apparatus according to claim 6, wherein said rearward member of the rear boom portion is pivotable relative to the forward member about an axis extending along said rear boom portion, and including means for restricting such pivotal movement.

8. Apparatus according to claim 7, wherein each arm is mounted on the beam to pivot upwardly about a transverse axis from a horizontal orientation.

9. Automobile towing apparatus for mounting on a tow truck, said apparatus comprising (a) a pair of vehicle lifts adapted to engage and lift transversely spaced apart portions of a disabled vehicle, each lift defining a plane, (b) a boom, (c) means for mounting the boom on the tow truck to project rearwardly therefrom, and (d) means supporting the vehicle lifts on a generally horizontally extending rear portion of the boom at transversely spaced apart locations adjacent the ground with their planes generally parallel with the ground, (e) the means for mounting the boom on the truck including means for pivoting said rearward portion thereof in a vertical plane between (i) a horizontal loading position in which said vehicle lifts lie closely adjacent ground substantially level with ground on which the truck stands, and (ii) a towing position in which said vehicle lifts are elevated above the ground and the vehicle is raised to a towing position, (f) said rear portion of the boom comprising an outer member and an inner member longitudinally slidable within the outer member, said inner member having a circular cross-section whereby to be pivotable within the outer member about an axis extending rearwardly along said rear portion of the boom, and wherein the means supporting the vehicle lifts on the rear portion of the boom include a transversely extending beam at respective ends of which said vehicle lifts are located, and means mounting said beam on said inner member to enable free pivoting of said beam with said inner member about said rearwardly extending axis to enable said vehicle lifts to lie closely adjacent ground sloping transversely relative to the ground on which the truck is standing in a side-sloped loading position, and means for restricting such pivotal movement of the inner member and hence the beam about said rearwardly extending axis.

10. Automoblie towing apparatus for mounting on a tow truck, said apparatus comprising (a) a pair of vehicle lifts adapted to engage and lift transversely spaced apart portions of a disabled vehicle, each lift defining a plane, (b) a boom, (c) means for mounting the boom on the tow truck to project rearwardly therefrom, and (d) means supporting the vehicle lifts on a generally horizontally extending rear portion of the boom at transversely spaced apart locations adjacent the ground with their planes generally parallel with the ground, (e) the means for mounting the boom on the truck including means for pivoting said rearward portion thereof in a vertical plane between (i) a horizontal loading position in which said vehicle lifts lie closely adjacent ground substantially level with ground on which the truck stands, and (ii) a towing position in which said vehicle lifts are elevated above the ground and the vehicle is raised to a towing position, (f) wherein the means supporting the vehicle lifts on the rear portion of the boom include a transversely extending beam at respective ends of which said vehicle lifts are located, means pivotally mounting said beam on said rear portion of the boom for movement about a substantially vertical axis in the horizontal loading position, and means for inhibiting such pivotal movement until a predetermined force is exerted to overcome such inhibiting means but to freely permit such pivotable movement after the inhibiting means have been overcome whereby to render the beam effectively non-pivotable about said vertical axis during a loading operation but freely pivotable about said vertical axis during towing in a curved path.

11. Apparatus according to claim 10, wherein said rear portion of the boom comprises an outer member and an inner member longitudinally slidable within the outer member, said inner member having a circular cross-section whereby to be pivotable within the outer member about an axis extending rearwardly along said rear portion of the boom, and including means mounting said beam on said inner member to enable free pivoting of said beam with said inner member about said rearwardly extending axis to enable said vehicle lifts to lie closely adjacent ground sloping transversely relative to the ground on which the truck is standing in a side-sloped loading position, and means for restricting such pivotal movement of the inner member and hence the beam about said rearwardly extending axis.

12. Apparatus according to claim 9, 10 or 11 wherein each vehicle lift comprises (g) a pair of spaced apart, rearwardly extending arms and a pair of spaced apart, transversely extending bar means joining the ends of the arms, said bar means being adapted to engage portions of a tire of the vehicle and together with the arms defining said plane of the lift, a forward one of said bar means constituting part of said beam, (h) means mounting the forward end of each arm on said forward bar means to pivot about a transverse axis, and (i) means limiting downward pivoting movement of the rear ends of the arms below a position in which the plane of the lift is horizontal is said horizontal loading position, while permitting said rear ends of the arms to move upwards to bring the plane of the lift into an up-sloped loading position with said plane parallel to ground that slopes upwardly and rearwardly away from the tow truck.

13. Apparatus according to claim 1, 2 or 5, including at least one brake bar mounted on the beam adjacent said vehicle lifts, each said brake bar being movable between an operative position in which it projects below the vehicle lifts towards but not engaging the ground when the apparatus is in the towing position but into engagement with the ground when the apparatus is lowered to the horizontal loading position, and an inoperative position in which it does not project below the vehicle lifts, for use in the loading position of the apparatus.

* * * * *